(12) United States Patent
Morita et al.

(10) Patent No.: US 8,154,591 B2
(45) Date of Patent: Apr. 10, 2012

(54) EYELID OPENING LEVEL DETERMINATION DEVICE AND COMPUTER READABLE MEDIUM STORING COMPUTER PROGRAM THEREOF

(75) Inventors: Takanori Morita, Kariya (JP); Takashi Hiramaki, Nagoya (JP); Jun Adachi, Obu (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 483 days.

(21) Appl. No.: 12/409,234

(22) Filed: Mar. 23, 2009

(65) Prior Publication Data
US 2009/0244274 A1 Oct. 1, 2009

(30) Foreign Application Priority Data
Mar. 31, 2008 (JP) ................. 2008-090537

(51) Int. Cl.
*H04N 7/18* (2006.01)
*G06K 9/00* (2006.01)
(52) U.S. Cl. .................. 348/78; 348/73; 382/117
(58) Field of Classification Search .............. 348/61, 348/73–78; 382/117–119
See application file for complete search history.

(56) References Cited

U.S. PATENT DOCUMENTS

| 7,209,574 B2 * | 4/2007 | Tafuku et al. ................. 382/103 |
| 7,444,017 B2 * | 10/2008 | Gallagher ..................... 382/117 |
| 7,957,566 B2 * | 6/2011 | Suzuki et al. ................. 382/117 |
| 2004/0193068 A1 * | 9/2004 | Burton et al. ................. 600/544 |
| 2006/0204041 A1 * | 9/2006 | Hammoud et al. ........... 382/107 |
| 2006/0204042 A1 * | 9/2006 | Hammoud et al. ........... 340/575 |
| 2007/0140531 A1 * | 6/2007 | Hamza .......................... 382/117 |
| 2008/0137959 A1 | 6/2008 | Adachi et al. |
| 2008/0151186 A1 | 6/2008 | Adachi et al. |
| 2008/0212828 A1 * | 9/2008 | Ishida et al. .................. 382/100 |
| 2008/0212850 A1 | 9/2008 | Adachi et al. |
| 2008/0218359 A1 * | 9/2008 | Ishida et al. .................. 340/575 |
| 2008/0226139 A1 | 9/2008 | Suzuki et al. |
| 2008/0226175 A1 | 9/2008 | Suzuki et al. |
| 2008/0253622 A1 * | 10/2008 | Tosa et al. ..................... 382/117 |
| 2009/0003709 A1 * | 1/2009 | Kaneda et al. ................ 382/190 |
| 2009/0010544 A1 * | 1/2009 | Li et al. ......................... 382/190 |
| 2010/0014759 A1 * | 1/2010 | Suzuki et al. ................. 382/195 |

FOREIGN PATENT DOCUMENTS

| EP | 1700567 A1 | 9/2006 |
| JP | 2004-192552 A | 7/2004 |
| WO | 2008/056229 A2 | 5/2008 |
| WO | 2008/069171 A1 | 6/2008 |

OTHER PUBLICATIONS

European Search Report dated Jul. 13, 2009 (7 pages). Abu Sayeed MD Sohail et al: "Classifying Facial Expressions Using Point-Based Analytic Face Model and Support Vector Machines" Systems, Man and Cybernetics, 2007. ISIC. Oct. 1, 2007 pp. 1008-1013.
Shenghua Xu et al: "An Algorithm to Edge Detection Based on Susan Filter and Embedded Confidence" Intelligent Systems Design and Applications, October 1, 2006.

* cited by examiner

*Primary Examiner* — Joshua Joo
(74) *Attorney, Agent, or Firm* — Sughrue Mion, PLLC

(57) ABSTRACT

An eyelid opening level determination device includes a face image taking unit; an upper eyelid detection unit for detecting an upper eyelid in the face image; a lower eyelid area setting unit for setting an area for searching a lower eyelid based on the upper eyelid; an edge group detecting unit for detecting an edge group where brightness changes from dark to bright as a lower eyelid candidate by scanning the area from an upper side to a lower side; a reliability value obtaining unit for obtaining a reliability value of the edge group; a lower eyelid determination unit in which the edge group having the reliability value exceeding a predetermined value in the edge group is determined to be the lower eyelid; and an eyelid opening level obtaining unit for obtaining opening level of the eyelid based on positions for the upper eyelid and the lower eyelid.

14 Claims, 18 Drawing Sheets

FIG. 3A
Operator for detecting vertical edge
| -1 | 0 | 1 |
|---|---|---|
| -2 | 0 | 2 |
| -1 | 0 | 1 |
FIG. 3B
Operator for detecting horizontal edge
| -1 | -2 | -1 |
|---|---|---|
| 0 | 0 | 0 |
| 1 | 2 | 1 |
FIG. 3C
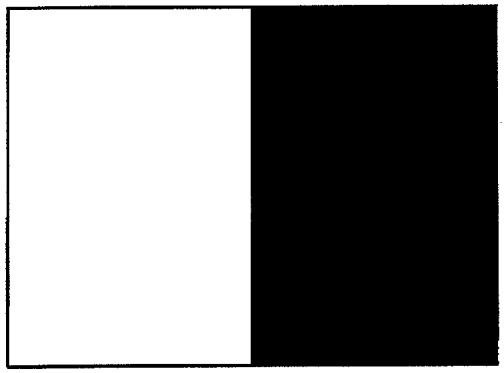
FIG. 3D
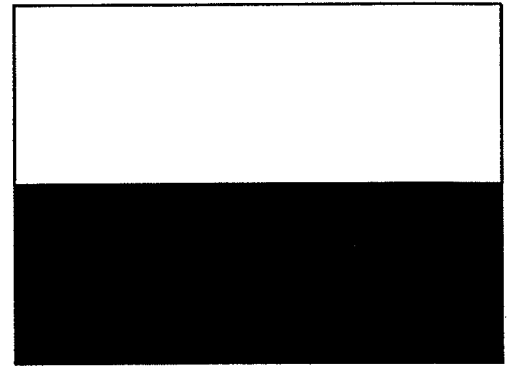

FIG. 4

Parameters for eyelid opening level determination process

| Parameter name | Value |
|---|---|
| Horizontal sobel threshold for detecting eyelid | 8 |
| Height of lower eyelid searching area | 30 PIXEL |
| Width of lower eyelid searching area | 15 PIXEL |
| Height of scanning window | 5 PIXEL |
| First threshold | 20 |
| Second threshold | 2 |
| Third threshold | 2 |

Upper eyelid searching area A

Upper eyelid searching area A

Upper eyelid searching area A

Lower eyelid searching area B1

Upper eyelid searching area A

Lower eyelid searching area B2

EYELID OPENING LEVEL DETERMINATION DEVICE AND COMPUTER READABLE MEDIUM STORING COMPUTER PROGRAM THEREOF

CROSS REFERENCE TO RELATED APPLICATIONS

This application is based on and claims priority under 35 U.S.C. §119 to Japanese Patent Application 2008-090537, filed on Mar. 31, 2008, the entire content of which is incorporated herein by reference.

FIELD OF THE INVENTION

The present invention relates to an eyelid opening level determination device and a computer readable medium storing computer program thereof. Especially, for example, the present invention relates to eyelid opening level determination device and a computer readable medium storing computer program thereof for determining opening level of eyelid of an eye of a driver operating a vehicle.

BACKGROUND

Recently, a device for determining the opening level of eyelid of eye which determines for example, whether an eyelid of the eye of the driver of the vehicle is opening or closing has been widely known.

For example, an eyelid opening level determining device disclosed in JP2004-192552A determines the opening level of the eyelid by combining an edge extraction process for detecting an edge line of an upper eyelid using a face image, a determining process for determining whether the eyelid is opening or closing according to a length of perpendicular line drawn from a peak point of an upper eyelid edge line to a line between both ends of the upper eyelid edge line, a determining process for determining whether the eyelid is opening or closing according to a vertical length of an eye binary image taken from the binaryzed face image, a determining process for determining whether the eyelid is opening or closing according to a distance between a peak point of the upper eyelid edge line and an eyebrow, and a determining process for determining whether the eyelid is opening or closing according to a curvature radius of the upper eyelid edge line.

When a part of a lower eyelid in the face image is lost due to overexposure, the distance between the peak point of the upper eyelid edge line and the lower eyelid cannot be detected correctly, thus the above mentioned eyelid opening level determination device cannot determine the eyelid opening level correctly. In addition, for determining the eyelid opening level based on the length of the perpendicular line drawn from the peak point of the upper eyelid edge line to a line between both ends of the upper eyelid edge line, when an inner corner of the eye or an outer corner of the eye is lacked, a line between the inner corner of the eye and the outer corner of the eye cannot be obtained correctly, thus the eyelid opening level determination device cannot determine the eyelid opening level correctly. In addition, for determining the eyelid opening level based on the distance between the peak point of the upper eyelid edge line and the eyebrow or curvature radius of the upper eyelid edge line, depending on the shape of the eyelid of the driver, the eyelid opening level determination device cannot determine the eyelid opening level correctly.

A need thus exists for an eyelid opening level determining device and a computer readable medium storing computer program thereof which is not susceptible to the drawback mentioned above.

SUMMARY OF THE INVENTION

According to an aspect of the present invention, an eyelid opening level determination device includes a face image taking unit for taking a face image, an upper eyelid detection unit for detecting an upper eyelid in the face image which is taken by the face image taking unit, a lower eyelid area setting unit for setting an area for searching a lower eyelid based on the upper eyelid detected by the upper eyelid detection unit, an edge group detecting unit for detecting an edge group where brightness changes from dark to bright as a lower eyelid candidate by scanning the area set by the lower eyelid area setting unit from an upper side to a lower side, a reliability value obtaining unit for obtaining a reliability value of the edge group detected by the edge group detecting unit, a lower eyelid determination unit in which the edge group having the reliability value exceeding a predetermined value in the edge group detected by the edge group detecting unit is determined to be the lower eyelid, and an eyelid opening level obtaining unit for obtaining opening level of the eyelid based on positions for the upper eyelid and the lower eyelid.

According to another aspect of the present invention, computer readable medium storing a computer program includes a face image taking unit for taking a face image, an upper eyelid detection unit for detecting an upper eyelid in the face image which is taken by the face image taking unit, a lower eyelid area setting unit for setting an area for searching a lower eyelid based on the upper eyelid detected by the upper eyelid detection unit, an edge group detecting unit for detecting an edge group where brightness changes from dark to bright as a lower eyelid candidate by scanning the area set by the lower eyelid area setting unit from an upper side to a lower side, a reliability value obtaining unit for obtaining a reliability value of the edge group detected by the edge group detecting unit, a lower eyelid determination unit in which the edge group having the reliability value exceeding a predetermined value in the edge group detected by the edge group detecting unit is determined to be the lower eyelid, and an eyelid opening level obtaining unit for obtaining opening level of the eyelid based on positions for the upper eyelid and the lower eyelid.

BRIEF DESCRIPTION OF THE DRAWINGS

The foregoing and additional features and characteristics of the present invention will become more apparent from the following detailed description considered with the reference to the accompanying drawings, wherein:

FIG. 3 is a schematic diagram explaining variety of data stored in a ROM;

FIG. 4 is a schematic diagram explaining variety of data stored in a setting memory;

DETAILED DESCRIPTION

First Embodiment

Hereinafter, an eyelid opening level determination device 50 according to a first embodiment of the present invention will be explained.

Figure 1:
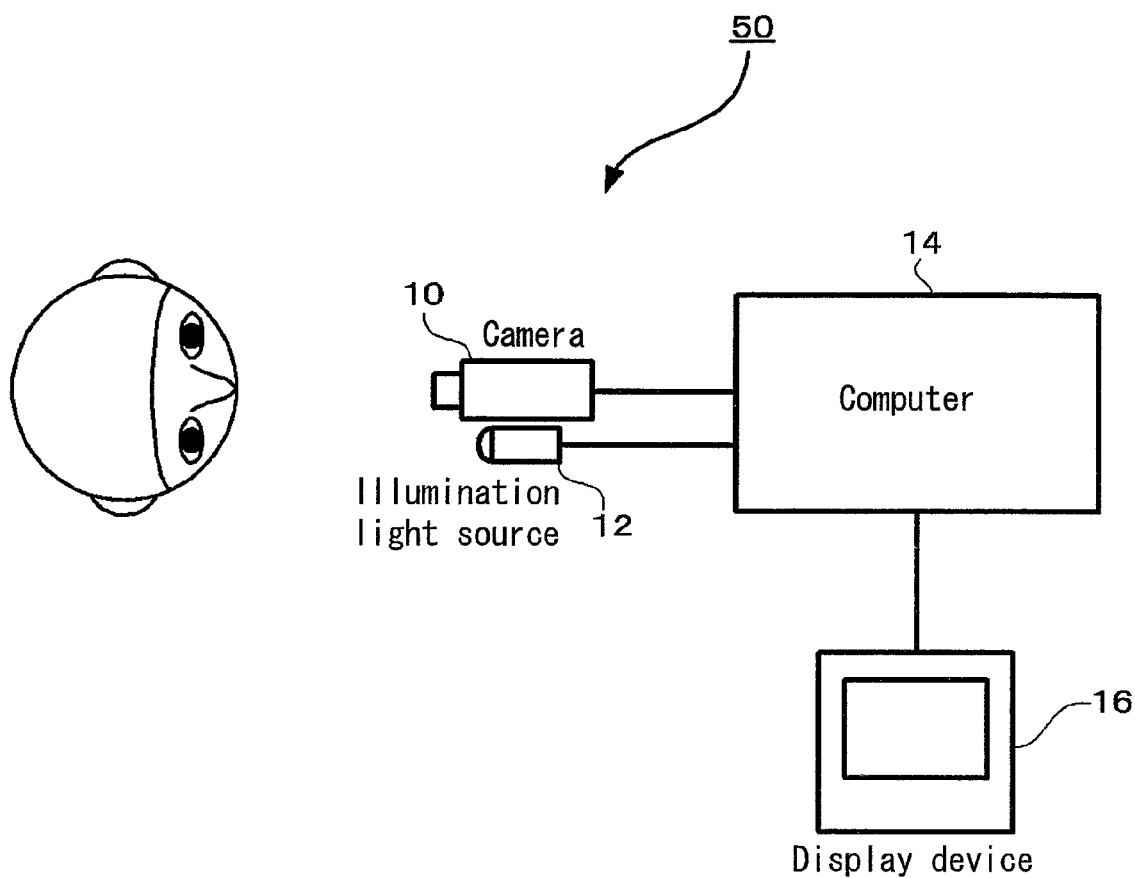
FIG. 1 is a schematic diagram of an eyelid opening level determination apparatus according to first through fourth embodiments of the present invention.

According to FIG. 1, the eyelid opening level determination device 50 of the first embodiment includes a camera (an face image taking unit) 10 taking a face image by taking a picture of a face of an driver, an illumination light source 12 illuminating the driver, a computer 14 determining the eyelid opening level of the driver, and a display device 16 connected to the computer 14.

The camera 14 is made up, for example, of a CCD camera or the like, and takes a gray-scale image of the face of the driver face at a constant frequency (for example, 1/30 seconds) and outputs. The face image sequentially output from the camera 10 may include not only the driver face (image) but also a background (image) etc.

The display device 16 is made up of a LCD (Liquid Crystal Display) or a CRT (Cathode Ray Tube) or the like, and displays the face image and others taken by the camera 10.

Figure 2:
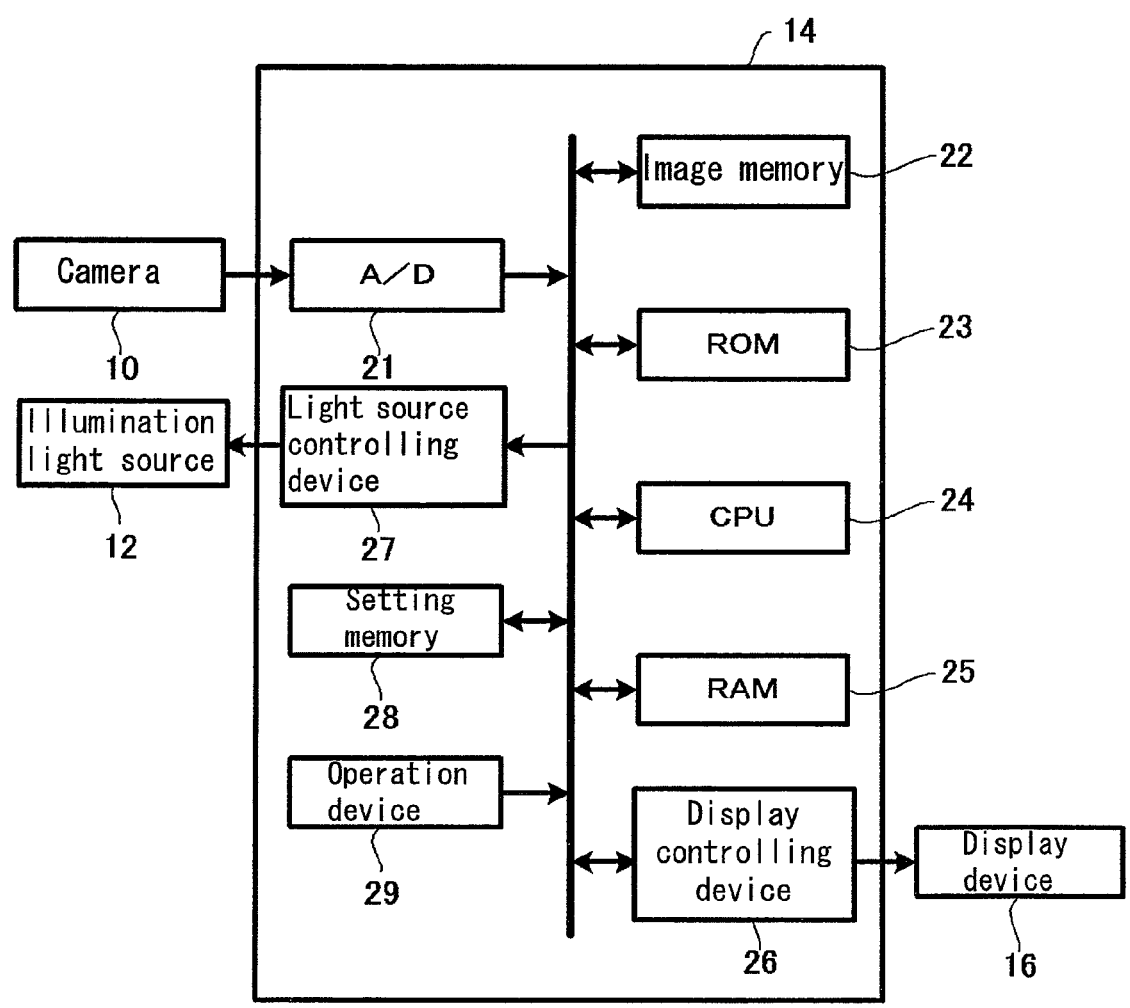
FIG. 2 is a block diagram of a structure of the computer shown in the FIG. 1.

The computer 14 is a device for determining the opening level of the eyelid (in other words, whether the eyelid is opening or closing) by processing moving images of the face taken by the camera 10. As shown in FIG. 2, the computer 14 includes an A/D converter 21, an image memory 22, a ROM (Read Only Memory) 23, a CPU (Central Processing Unit) 24, a RAM (Random Access Memory) 25, a display controlling device 26, a light source controlling device 27, a setting memory 28, and an operation device 29.

The A/D (Analog/Digital) converter 21 converts an analog image signal taken by the camera 10 into a digital signal.

The image memory 22 stores image data taken by the camera 10 and digitized by the A/D converter 21.

The ROM 23 stores a program for controlling an operation of the CPU. Further, the ROM 23 stores various fixed data used for executing image processing described below.

The CPU 24, which corresponds to an upper eyelid detection unit, a lower eyelid area setting unit, an edge group detecting unit, a reliability value obtaining unit, a lower eyelid determination unit, an eyelid opening level obtaining unit, an inclination angle calculation unit, and a window rotating unit, controls the computer 14. Further, the CPU 24 executes the program stored in the ROM 23, and determines the eyelid opening level by processing series of face images taken by the camera 10.

The RAM 25 performs as a working area of the CPU 24.

The display control device 26 outputs to the display device 16 by converting the image data or the like into data with a data format which can be output by the display device 16 under control by the CPU 24.

The light source controlling device 27 controls an ON or OFF operation of the illumination light source 12.

The setting memory 28 stores information for setting the eyelid opening level determination process in which the CPU 24 processes the face image (herein after referred to as setting information).

The operation device 29 accepts operation information from a user and outputs an operation signal according to the operation to the CPU 24.

Next, an example of fixed data stored in the ROM 23 is explained with reference to FIG. 3. First, the ROM 23 stores operator of vertical edge detection sobel filter as shown in FIG. 3A. The vertical edge detection sobel filter is an operator for emphasizing contrast in a longitudinal direction as shown in FIG. 3C. Also, the ROM 23 stores an operator of horizontal edge detection sobel filter as shown in FIG. 3B. The horizontal edge detection sobel filter is an operator for emphasizing contrast in a lateral direction as shown in FIG. 3D.

In this regard, as a premise, each pixel for making the face image is set to have 8-bit gray-scale for RGB colors respectively. Namely, each pixel has any one of gray-scale level in 256 levels from level 0 to level 255. Level 0 corresponds to black, and level 255 corresponds to white.

An example of various types of parameters (setting information) stored in the setting memory 28 is explained with reference to FIG. 4. Horizontal sobel threshold for detecting eyelid is the threshold for determining whether there are horizontal edge lines based on differential value of each pixel processed using a horizontal edge detection sobel filter when the upper or the lower eyelid to be detected is taken from the face image. A height of a lower eyelid searching area is the height of the lower eyelid searching area which is the area for searching the lower eyelid. A width of the lower eyelid searching area is the width of lower eyelid searching area. A lower eyelid searching area is set so that the detected upper eyelid is located on an upper portion of the lower eyelid searching area, and the height of the lower eyelid searching area is set to be the height of the lower eyelid searching area and the width of the lower eyelid searching area is set to be the width of the lower eyelid searching area. The height of scanning window is the height of scanning window used for searching lower eyelid in the lower eyelid searching area. The width of scanning window is equivalent to the width of the lower eyelid searching area. A first threshold is a threshold for determining whether or not a calculation of a reliability value is executed based on a comparison with a number of edges within the scanning window. A second threshold is a threshold for determining whether or not the detected edge group is the lower eyelid based on a comparison with a reliability value described hereinafter. A third threshold is a threshold for determining the eyelid opening level based on a comparison with a distance between the upper and the lower eyelids. The value for setting information is changeable depending on user.

Hereinafter, an operation of the eyelid opening determination device 50 according to the first embodiment will be explained.

First, an outline of an operation that the eyelid opening determination device 50 determines the opening level of eyelid in a face image will be explained with reference to FIG. 5 through FIG. 7

Figure 5A:
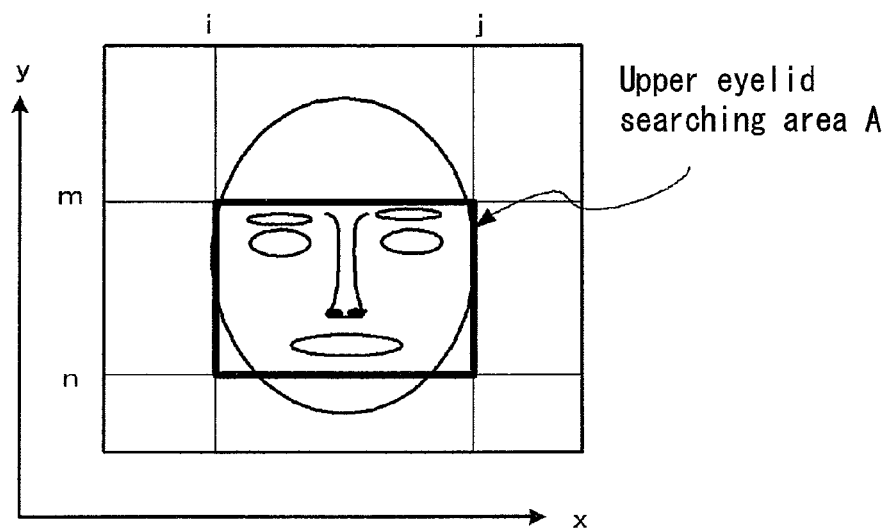
FIG. 5 is a schematic diagram explaining an outline of a process for setting an upper eyelid searching area.

The camera 10 takes a face image of an object person (for example, the driver) as shown in FIG. 5A, and outputs the face image in a predetermined cycle (for example, 30 Hz frequency). The face image output is sequentially stored in the image memory 22.

Next, the CPU 24 retrieves the face images stored in the image memory 22 in a sequential manner, and execute following processes.

The CPU 24 processes, using the sobel filter for detecting longitude edge (FIG. 3A), the retrieved face image and detects right and left edges of the face based on differential value of each pixel of the face image. Also, The CPU 24 processes, using the sobel filter for detecting horizontal edge (FIG. 3B), the retrieved face image and detects upper and lower edges of the face based on a brightness value of each pixel of the face image.

For example, in the case where the face image is shown in FIG. 5A, right and left edges of the face are represented by $i \leq x \leq j$, and upper and lower edges of the face are represented by $n \leq y \leq m$. A position of the face is detected in accordance with right and left edges and upper and lower edges of the face. For example, the upper edge of the face is located between eyebrow and forehead, and the lower edge of the face is located between mouth and chin.

Figure 5B:
Figure 6A:
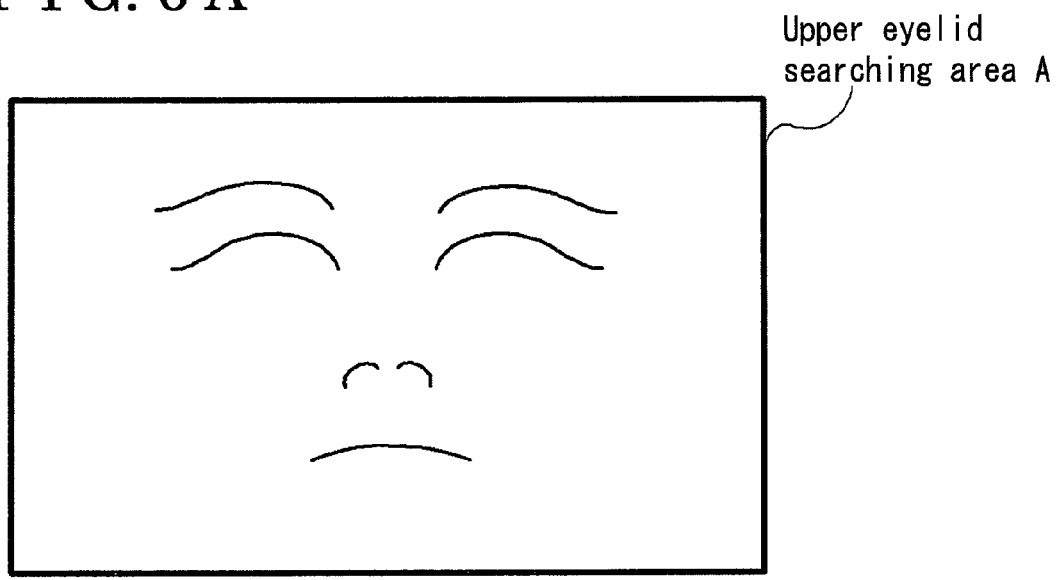
FIG. 6 is a schematic diagram explaining an outline of a process for setting a lower eyelid searching area based on the detected upper eyelid.

The CPU 24 sets an upper eyelid searching area A ($i \leq x \leq j$, $n \leq y \leq m$) as shown in FIG. 5A and FIG. 5B, and then detects a horizontal edge line in which a brightness value is changed from bright to dark on the upper eyelid searching area A using a sobel filter for detecting horizontal edge (FIG. 3B) as shown in FIG. 6. In detail, when a value processed by the sobel filter for detecting horizontal edge from the upper portion to the lower portion in the upper eyelid searching area A is negative, and the absolute value of a pixel exceeds the threshold value of a horizontal sobel threshold for detecting the eyelid, the pixel is detected as an edge, and the detected edges are detected as horizontal edge lines.

The CPU 24 determines the edge line of the upper eyelid by classifying the detected horizontal edge line into left and right eyebrows, left and right upper eyelids, nostrils, mouth and so on by template matching method and so on.

Figure 6B:
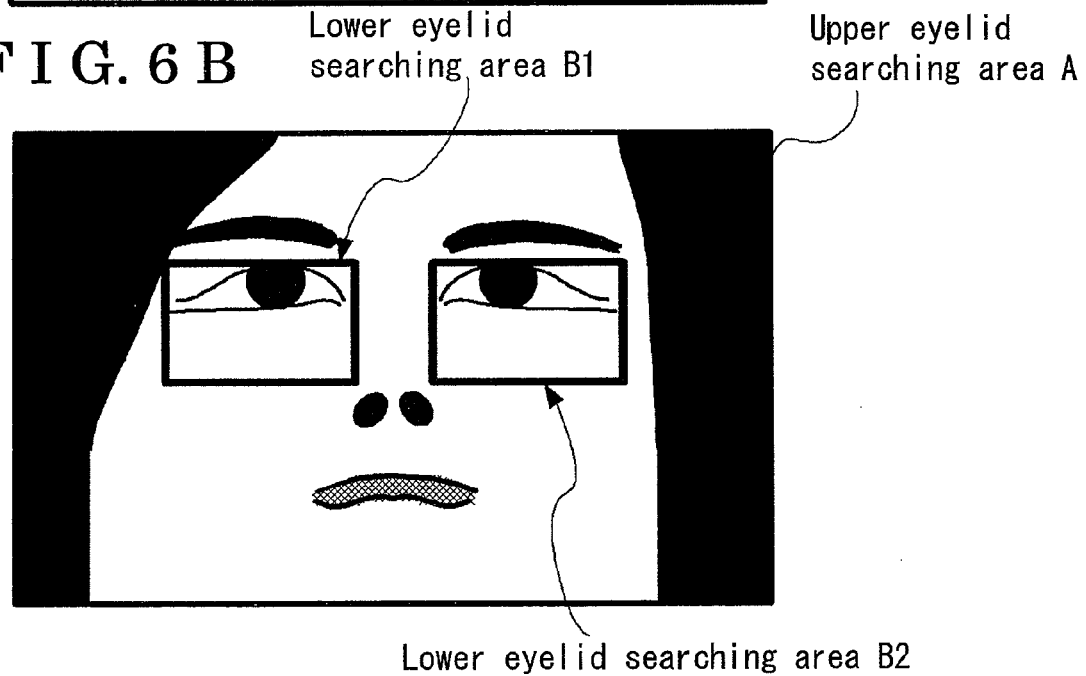
Figure 7:
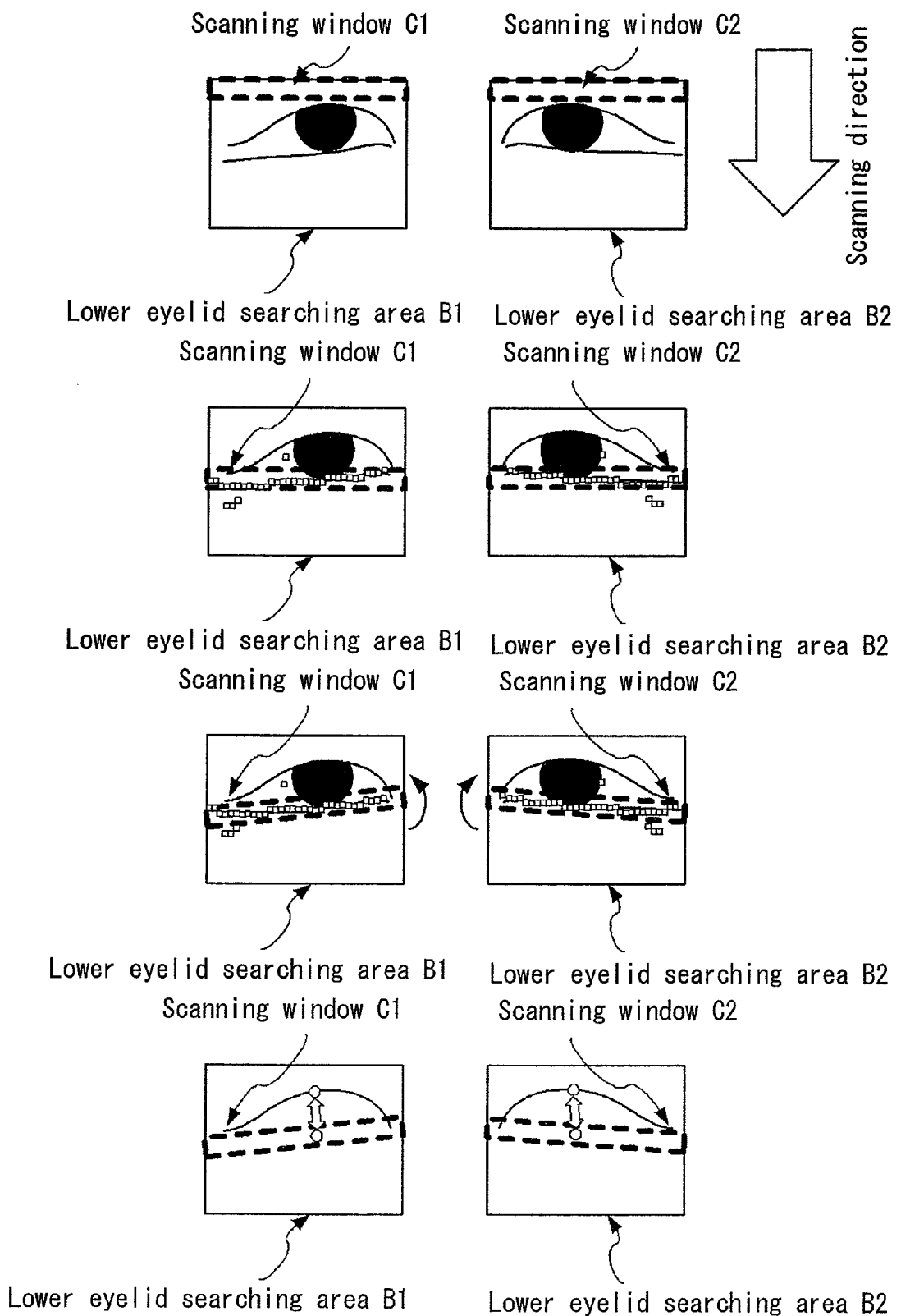
FIG. 7 is a schematic diagram explaining an outline of a process for detecting the lower eyelid in the lower eyelid searching area and calculating a distance between the upper eyelid and the lower eyelid.

As shown in FIG. 6B, with a basis of the edge line of the right and left upper eyelids, the CPU 24 sets the lower eyelid searching areas B1, B2 which have a high possibility to contain the lower eyelid. In this regard, the height and the width of the lower eyelid searching areas B1, B2 are predetermined.

As shown in FIG. 7A, the CPU 24 generates scanning windows C1, C2 at an uppermost part of the lower eyelid searching areas B1, B2 respectively.

The CPU 24 detects edges that brightness value changes from dark to bright by scanning the scanning windows C1, C2 in the lower eyelid searching areas B1, B2. In detail, when a value processed by the sobel filter for detecting the horizontal edge from the upper portion to the lower portion in the searching window A is positive, and the absolute value of a pixel exceeds the threshold value of the horizontal sobel threshold for detecting the eyelid, the pixel is detected as the edge.

When the CPU 24 detects an edge group, where a total number of edges included in the edge group exceeds the first threshold, the CPU 24 stops scanning and calculates the inclination angle of the edge group and centroid of the edge group. The inclination angle of the edge group is an average value of the inclination angle for several pixels included in the edge group detected using the sobel filter. For example, the inclination angle of edge group may be the inclination angle of an approximated straight line or curved line of the edge group.

As shown in FIG. 7C, the CPU 24 rotates the scanning window with a center on the centroid of edge group based on the inclination angle calculated. In other words, the scanning window is matched to the inclination angle of the edge group.

Again the CPU 24 detects the edges that brightness value changes from dark to bright in the rotated scanning window, and calculates the reliability value of the detected edge group. In this regard, the reliability value is calculated based on a value dividing number of edges included in the rotated scanning window by a distance between the position of centroid of the upper eyelid and the edge group within the scanning window. The distance between the position of the centroid of the upper eyelid may be a distance between the centroid of the upper eyelid and the center of the scanning window, a distance between centroid of the upper eyelid and the centroid of the edge group within the scanning window, or average value of distance between centroid of the upper eyelid and position of each edge within the scanning area.

The CPU 24 determines the edge group within the scanning window when the calculated reliability value that is exceeding the second threshold.

On the other hand, when the calculated reliability value is not exceeding the second threshold, the CPU 24 restarts scanning the scanning window which has not been rotated.

When the lower eyelid is detected, the CPU 24 calculates a distance between the upper eyelid and the lower eyelid as an opening level of the eyelid. Then, the CPU 24 determines whether the eyelid is opening or closing based on the calculated distance. In this regard, the distance between the upper eyelid and the lower eyelids may be a distance between the centroid or the center of the upper eyelid and the centroid or the center of the lower eyelid, or a distance of the perpendicular line from a point of the upper eyelid or the lower eyelid to an approximated line of the lower eyelid or the upper eyelid. In addition, to determine the opening level of the eyelid, when the calculated distance is exceeding the third threshold, it is determined that the eyelid is opening. When the calculated distance is not exceeding the third threshold, it is determined that eye is closing.

The eyelid condition determination process executed by the eyelid opening level determination device 50 according to the embodiment is explained below with reference to the flow chart shown in FIG. 8.

Figure 8:
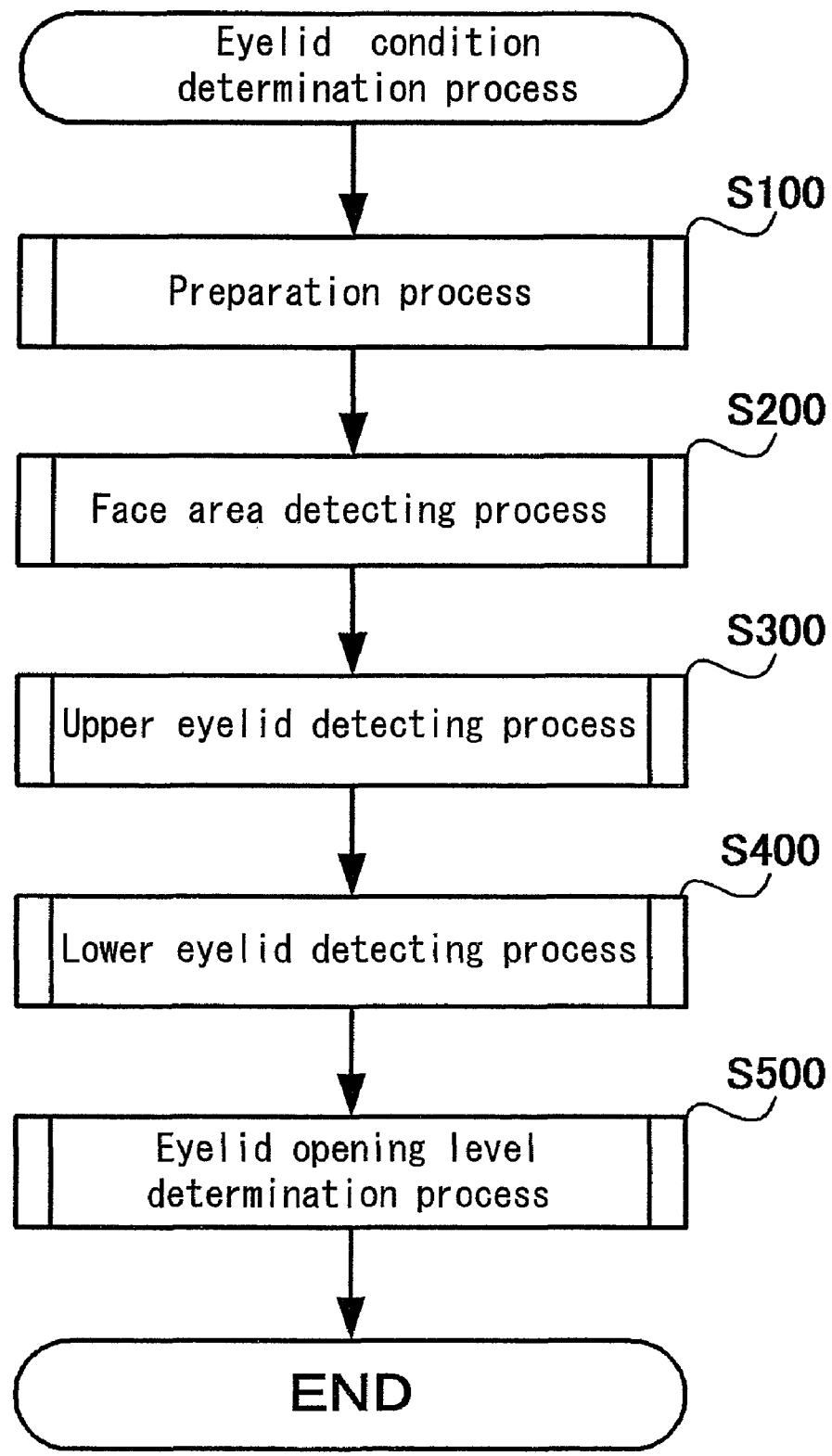
FIG. 8 is a flowchart explaining an eyelid condition determination process according to first through fourth embodiments of the present invention.

The CPU 24 included in the computer 14 periodically (for example 1/30 seconds cycle) starts the eyelid condition determination process according to FIG. 8.

When electrical power supply is activated, the CPU 24 executes a preparation process (step S100) which will be described later. In this process, the CPU 24 captures the face image of the driver, and then takes an image that emphasizes the vertical edge and an image that emphasizes the horizontal edge.

Next, in step S200, the CPU 24 executes a face area detecting process which will be described later. In this process, the CPU 24 detects the left edge and the right edge of the face in the image by emphasizing vertical edge taken in the previous preparation process, and detects the upper edge and the lower edge of the face in the image by emphasizing the horizontal edge taken in the previous preparation process.

Next, in step S300, the CPU 24 executes an upper eyelid detecting process which will be described later. In this process, the CPU 24 detects the position of the upper eyelid based on an area of the face detected in the previous face area detecting process.

Next, in step S400, the CPU 24 executes a lower eyelid detecting process which will be described later. In this process, the CPU 24 detects the position of the lower eyelid based on the position of the upper eyelid detected in the previous upper eyelid detecting process.

Next, in step S500, the CPU 24 executes an eyelid opening level determination process which will be described later. In this process, the CPU 24 determines eyelid opening level based on the position of the upper eyelid detected in the previous upper eyelid detecting process position of the lower eyelid detected in the previous lower eyelid detecting process.

As stated above, by means of the eyelid condition determination process, it may be periodically repeated that the face image is captured, the upper eyelid and the lower eyelid of the eye are detected in the image, and the opening level of the eyelid is determined.

Hereinafter, the preparation process executed in step S100 of the eyelid condition determination process will be explained. In brief explanation of the preparation process, the eyelid opening level determination device 50 takes the face image of the driver, and executes the edge detection using the sobel filter.

Figure 9:
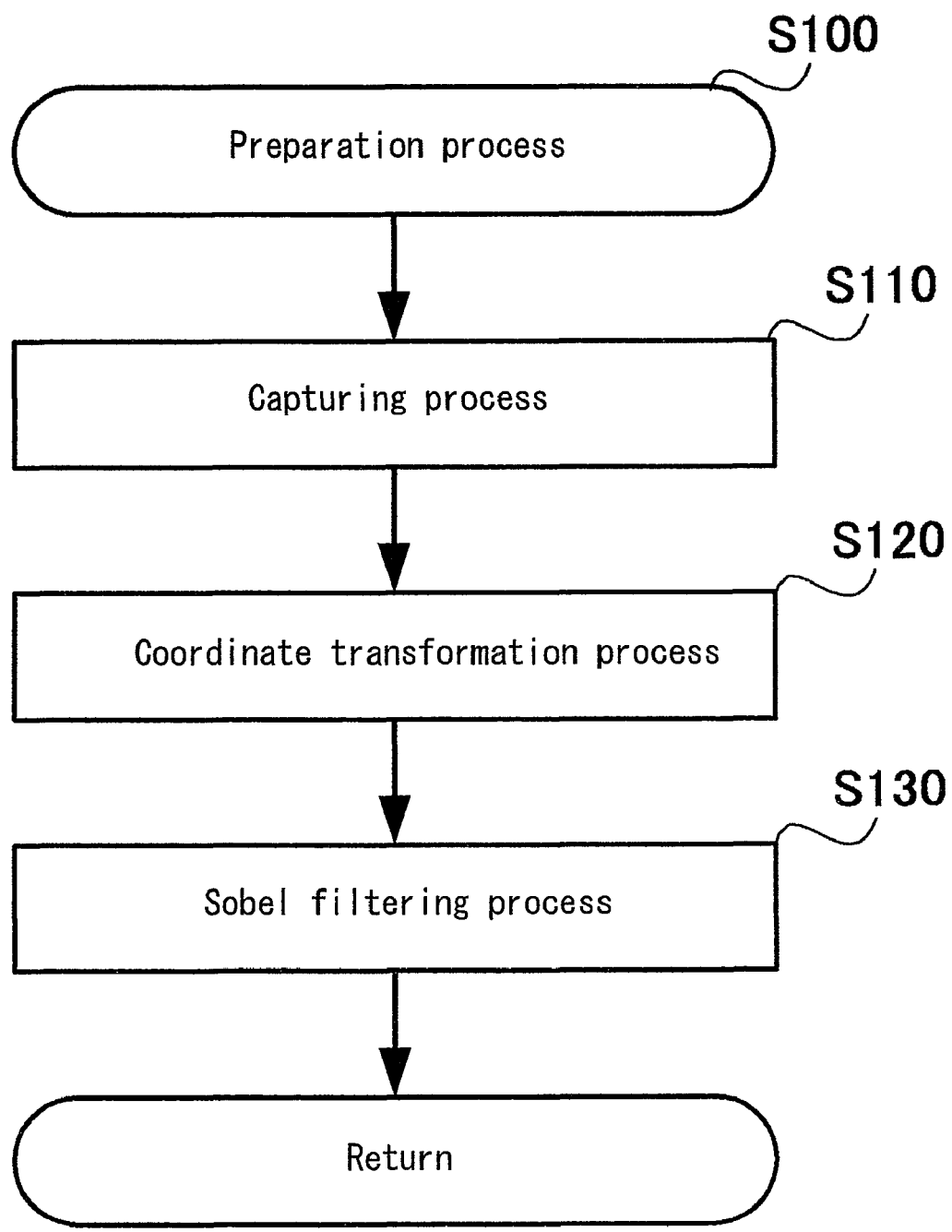
FIG. 9 is a flow chart explaining a preparation process of the eyelid condition determination process.

With reference to FIG. 9, the preparation process (step S100) will be explained in detail.

First, in step S110, the CPU 24 executes a capturing process. In this process the CPU 24 captures the face image of the object person taken by the camera 10 through the A/D converter 21, and stores in the image memory 22.

Next, in step S120, the CPU 24 executes a coordinate transformation process. In this process, the CPU 24 executes a process for cutting out pixels composing the face image stored in the image memory 22 so that the sobel filtering process which will be explained later is able to be executed. This process may be executed where necessary since it is executed with high-speed.

Next, in step S130, the CPU 24 executes a sobel filtering process. In this process, the CPU 24 generates an image emphasizing the vertical edge in the face image by processing the face image after the coordinate transformation process using operator for detecting vertical edge (see FIG. 3A). Also, the. CPU 24 generates an image emphasizing the horizontal edge in the face image by processing the face image after the coordinate transformation process using operator for detecting horizontal edge (see FIG. 3B).

As stated above, by means of the preparation process, vertical edge emphasizing image and the horizontal edge emphasizing image of the taken face image may be generated.

Hereinafter, the face area detecting process executed in step S200 of the eyelid condition determination process will be explained. In brief explanation of the face area detecting process, the eyelid opening level determination device 50 detects the face area in the face image using the vertical edge emphasizing image and the horizontal edge emphasizing image prepared in the preparation process.

Figure 10:
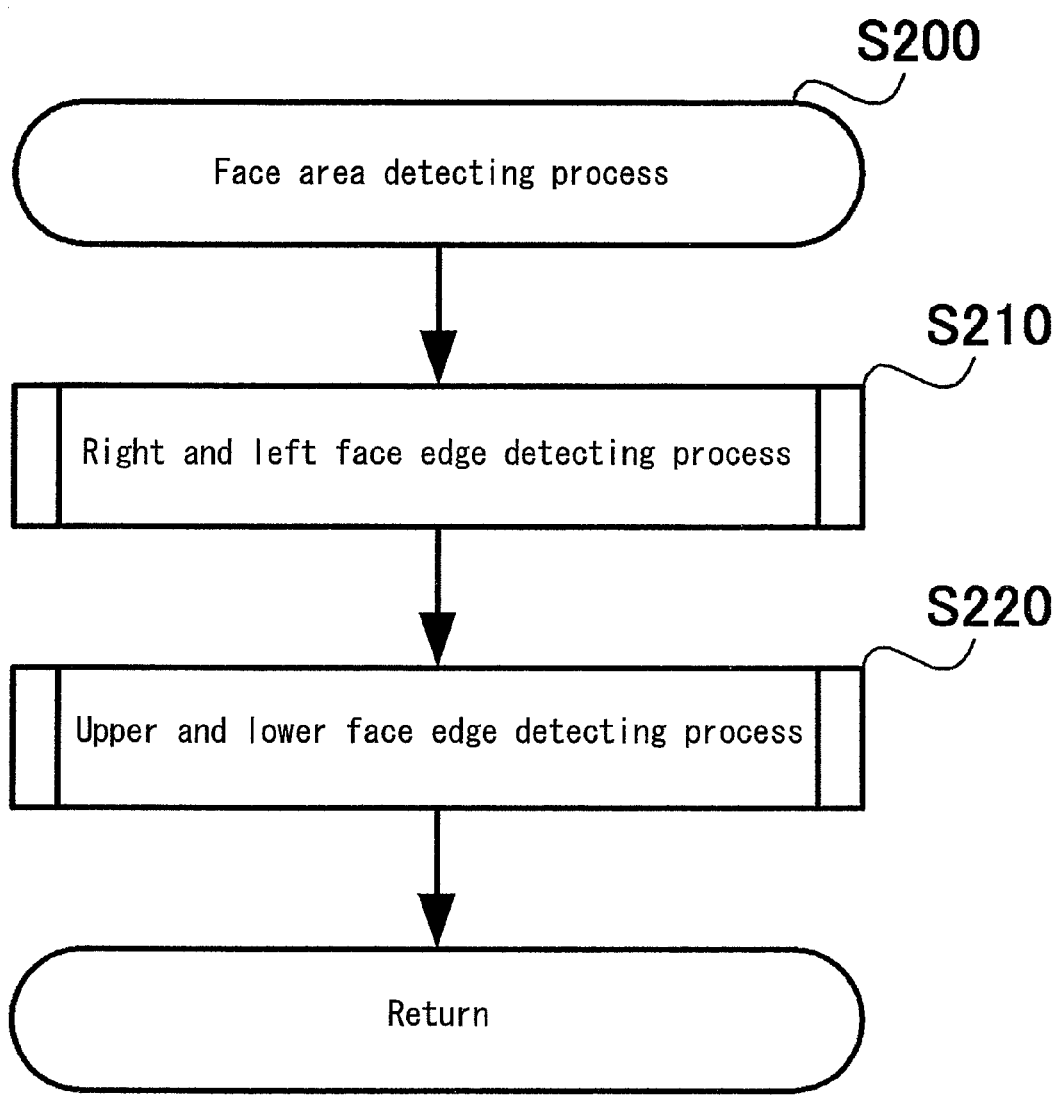
FIG. 10 is a flow chart explaining a face area detecting process of the eyelid condition determination process.

With reference to FIG. 10, face area detecting process (step S200) will be explained in detail.

First, in step S210, the CPU 24 executes a right and left face edge detecting process. In this process, the CPU 24 detects position of the right edge and the left edge of the face in the face image using the vertical edge emphasizing image prepared in the preparation process.

Next, in step S220, the CPU 24 executes a upper and lower face edge detecting process. In this process, the CPU 24 detects position of the upper edge and the lower edge of the face in the face image using the horizontal edge emphasizing image prepared in the preparation process.

As stated above, by means of the face area detecting process, the face area in the face image may be detected by detecting the right and left edges and the upper and lower edges of the face.

Figure 11:
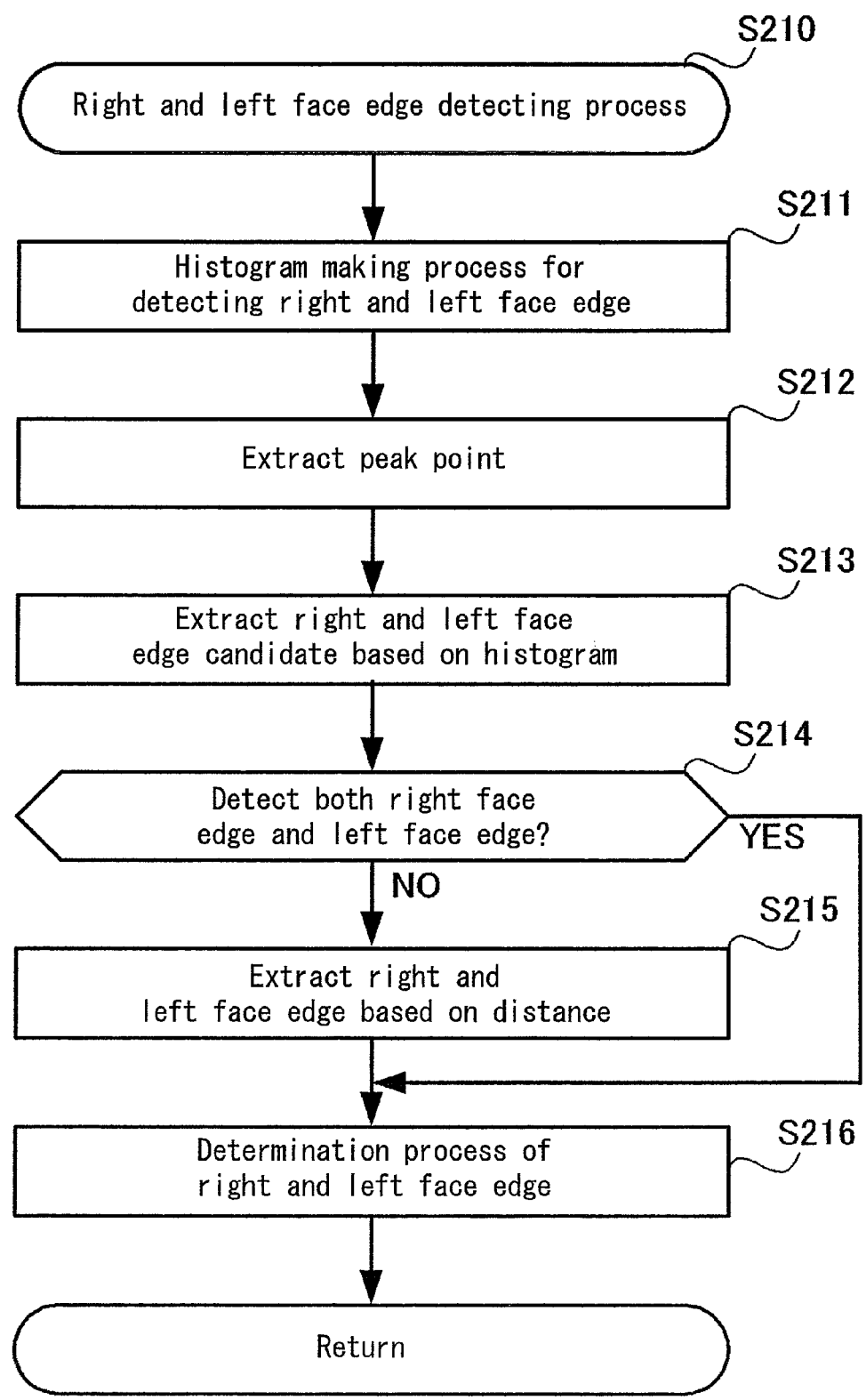
FIG. 11 is a flow chart explaining detecting process of a right and left edges of the face of the eye condition determination process.

Hereinafter, the right and left face edge detecting process executed in the step S210 of the face area detecting process will be explained. In brief explanation of the right and left face edge detecting process, the eyelid opening level determination device 50 detects the position of the right edge and the left edge of the face in the face image using the vertical edge emphasizing image generated in the preparation process With reference to FIG. 11, the right and left face edge detecting process (step S210) will be explained in detail.

First, in step S211, the CPU 24 executes a histogram making process for detecting the right and left face edges. In this process, the CPU 24 makes a histogram by projecting values of each pixel, after the sobel filtering process using the sobel filter for detecting vertical edge, in longitudinal direction. In particular, values of pixel for each coordinate are divided into several classes, then, modal class of values of pixel is determined for each x value. A graph for average value of classes for each x value is the histogram.

Next, in step S212, the CPU 24 extracts a peak point which is a peak of the histogram made in the step S211.

Next, in step S213, the CPU 24 extracts the right and left face edge candidate based on the histogram value which has a value exceeding a threshold value from peak points extracted in the step S212.

Next, in step S214, the CPU 24 determines whether two peak points of histogram value exceeding the threshold are extracted as a candidate of right and left face edges.

If it is determined that two peak points of histogram value over the threshold are extracted (step S214;YES), the CPU 24 proceeds to step S216, and determines positions of two extracted peak points as the right and left face edges.

As stated above, by means of the right and left face edges detecting process, the right face edge and the left face edge are detected from the face image.

Hereinafter, the upper and lower edge face detecting process executed in step S220 of the face area detecting process will be explained. In brief explanation of the upper and lower face edge detecting process, the eyelid opening level determination device 50 detects a position of the upper edge and the lower edge of the face in the face image using the horizontal edge line emphasizing image generated in the preparation process.

Figure 12:
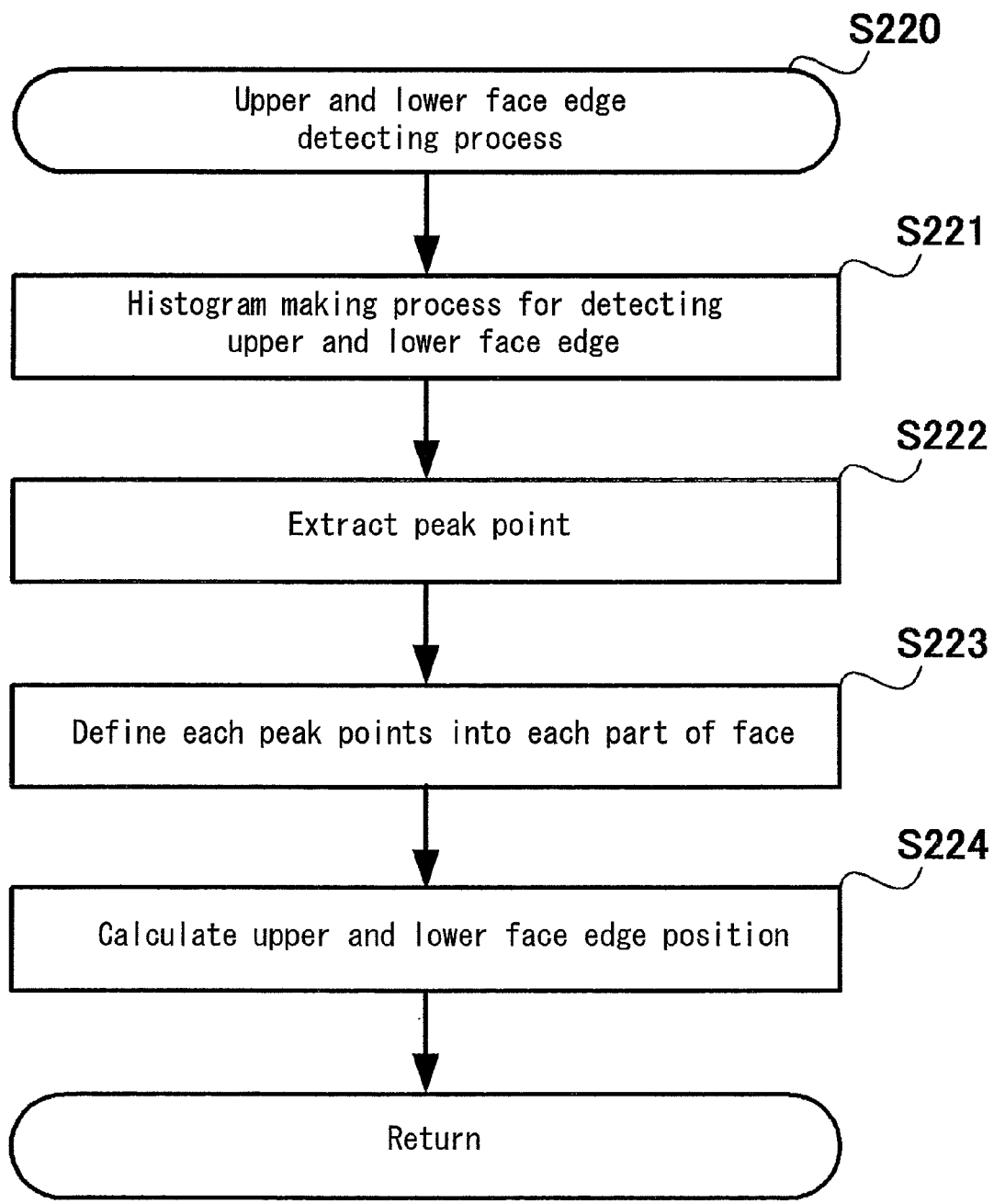
FIG. 12 is a flow chart explaining a detecting process of an upper and lower edges of the face of the eye condition determination process.

With reference to FIG. 12, the upper and lower face edge detecting process (step S220) will be explained in detail.

First, in step S221, the CPU 24 executes a histogram making process for detecting upper and lower face edges. In this process, the CPU 24 makes a histogram by projecting values of each pixel, after the sobel filtering process using the sobel filter for detecting horizontal edge, in lateral direction. In particular, values of pixel for each coordinate are divided into several classes, then, the modal class of values of pixel is determined for each y value. A graph for average value of classes for each y value is the histogram.

Next, in step S222, the CPU 24 extracts a peak point which is a peak of the histogram made in the step S221.

Next, in step S223, the CPU 24 relates each peak points to the eyes, the eyebrows, the mouth and so on based on the histogram value of the peak points extracted in the step S222.

Next, in step S224, the CPU 24 calculates the position of the upper edge and the lower edge of the face in the face image based on each peak point related to the eyes, the eyebrows, the mouth and so on in the step S223. For example, the upper position which is separated three pixels from the detected eyebrows is defined as the upper edge of the face, and the lower position which is separated three pixels from detected mouth is defined as the lower edge of the face.

As stated above, by means of the upper and lower face edge detecting process, the position of the upper edge and the lower edge of the face in the face image may be calculated.

Figure 13:
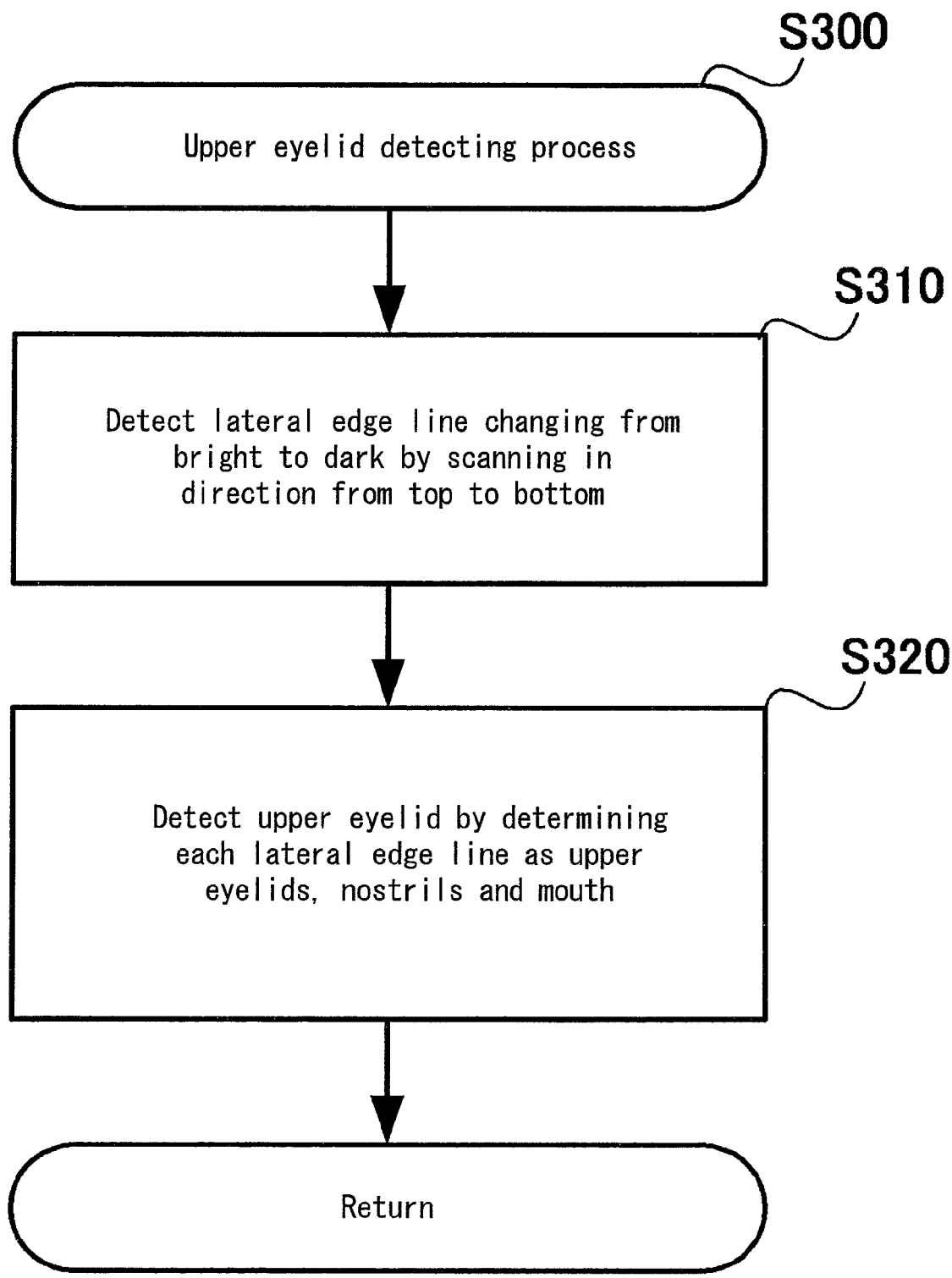
FIG. 13 is a flow chart explaining an upper eyelid detecting process of the eyelid condition determination process.

Hereinafter, with reference to FIG. 13, the upper eyelid detecting process (step S300) will be explained in detail.

First, in step S310, the CPU 24 detects the horizontal edge line where the brightness value changes from bright to dark by processing an image of an area defined by the upper, lower, right and left edges of the face detected by face area detecting process using the operator for detecting horizontal edge (see FIG. 3B) stored in the ROM23.

Next, in step S320, the CPU 24 detects the position of the upper eyelid by distinguishing the horizontal edge line extracted in the step S310 into the right upper eyelid, the left upper eyelid, the right nostril, the left nostril and the mouth by using template matching method and so on.

As stated above, by means of the upper eyelid detecting process, the upper eyelid may be detected within the area defined by the upper edge, the lower edge, the right edge and the left edge of the face.

Figure 14:
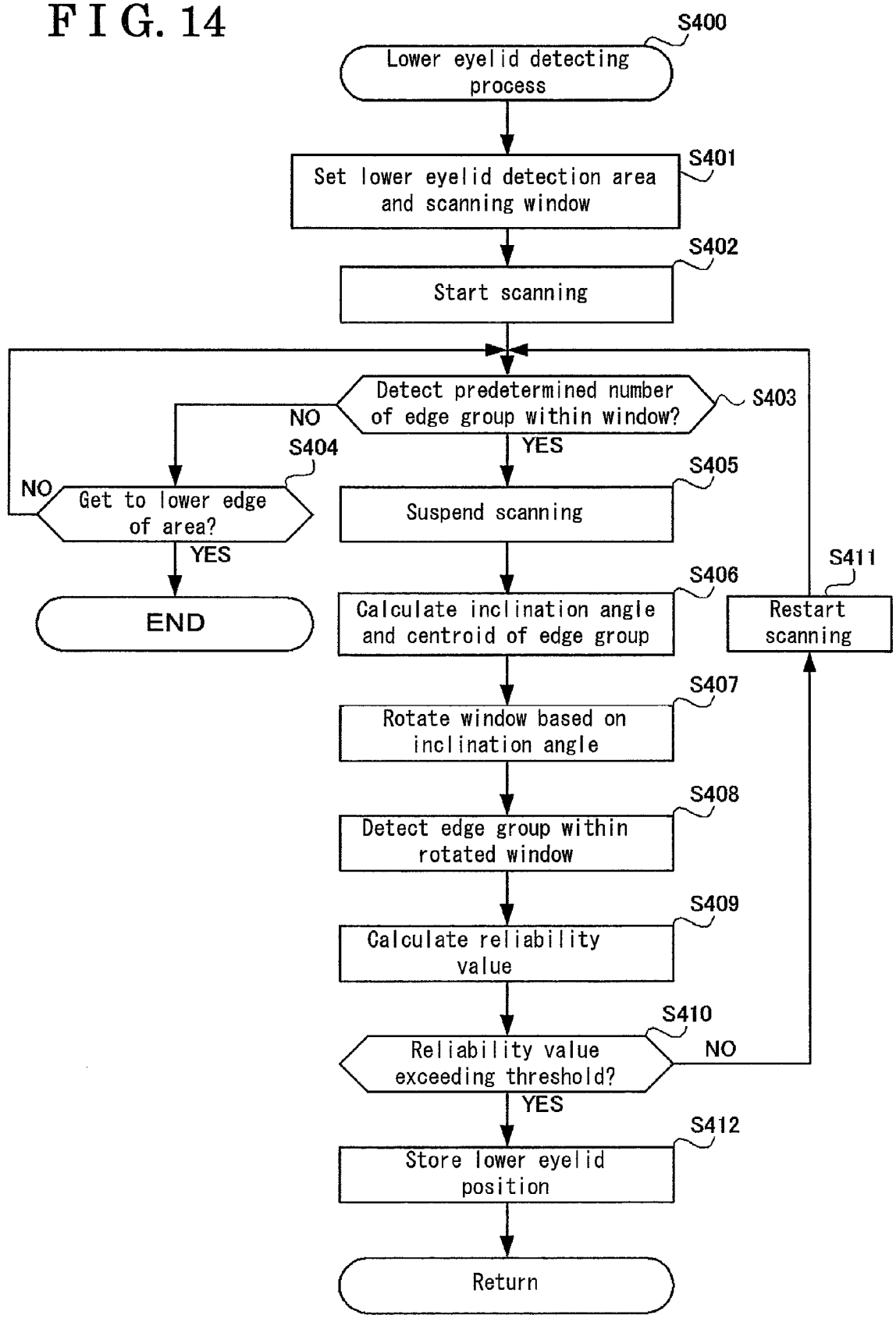
FIG. 14 is a flow chart explaining an lower eyelid detecting process of the eyelid condition determination process according to a first embodiment.

Hereinafter, with reference to FIG. 14, the lower eyelid detecting process (step S400) will be explained in detail.

First, in step S401, the CPU 24 sets the lower eyelid detection area, which has high possibility to include the lower eyelid, based on the position of the edge line for either the right eyelid or the left upper eyelid detected in the upper eyelid detecting process, and then sets the scanning window at the upper side of the lower eyelid detection area.

Next, in step S402, the CPU 24 starts scanning from the upper side to the lower side of the lower eyelid detection area using the scanning window, and starts detection of the edge where the brightness value changes from bright to dark.

Next, in step S403, the CPU 24 determines whether the edge group where a total number of edges included in the edge group exceeds the first threshold is detected within the scanning window.

If the edge group where a total number of edges included in the edge group exceeds the first threshold is not detected (step S403; NO), the CPU 24 determines whether the scanning window gets to the lower edge of the lower eyelid detecting area (step S404).

If the scanning window does not get to the lower edge of the lower eyelid detecting area (step S404; NO), the CPU 24 returns to the step S403.

If the scanning window gets to the lower edge of the lower eyelid detecting area (step S404; YES), the CPU 24 terminates the eyelid condition determination process.

If the edge group where a total number of edges included in the edge group exceeds the first threshold is detected (step S403; YES), the CPU 24 suspends the scanning of the scanning window (step S405), and calculates the inclination angle and the centroid of the edge group (step S406).

Next, in step S407, the CPU 24 rotates the scanning window around the centroid of the edge group based on calculated inclination angle.

Next, the CPU 24 detects the edge group where the brightness value changes from bright to dark within the rotated scanning window (step S408), and calculates the reliability value of the detected edge group (step S409).

Next, in step S410, the CPU 24 determines whether the calculated reliability value is exceeding the second threshold.

If the calculated reliability value is not exceeding the second threshold (step S410; NO), the CPU 24 returns to the condition before rotation of the scanning window, and restarts scanning (step S411), then returns to the step S403.

If the calculated reliability value is exceeding the second threshold (step S410; YES), the CPU 24 determines the edge group with the reliability value included in the scanning window as the lower eyelid, and stores to the RAM 25 (step S412), then proceeds to the eyelid opening level determination process as will be described later.

As stated above, by means of the lower eyelid detecting process, the lower eyelid may be detected with accuracy by setting the predetermined area and scanning within the area with the scanning window.

Figure 15:
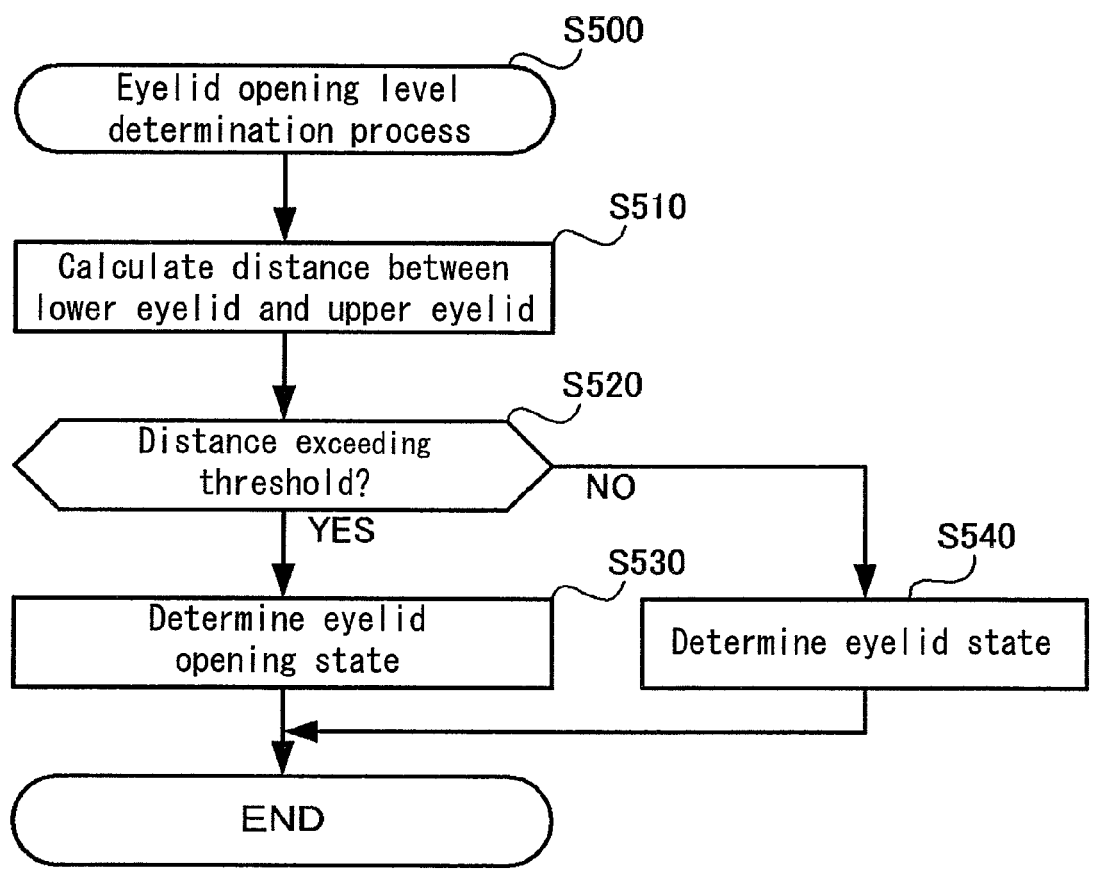
FIG. 15 is a flow chart explaining the eyelid opening level determination process of the eyelid condition determination process.

Hereinafter, with reference to FIG. 15, the eyelid opening level determination process (step S500) will be explained in detail.

First, in step S510, the CPU 24 calculates the distance between the upper eyelid detected by the upper eyelid detecting process and the lower eyelid detected by lower eyelid detecting process.

Next, in step S520, the CPU 24 determines whether the distance between the upper eyelid and the lower eyelid is exceeding the third threshold.

If the distance between the upper eyelid and the lower eyelid is exceeding the third threshold (step S520, YES), the CPU 24 determines that the eyelid is in opening state, and stores into the RAM 25 (step S530), then terminates the process.

If the distance between the upper eyelid and the lower eyelid is not exceeding the third threshold (step S520; NO), the CPU 24 determines that the eye is in closing state, and stores into the RAM 25 (step S540), then terminates the process.

As stated above, by means of the eyelid opening level determination process, the opening level of the eyelid may be determined based on the distance between the upper eyelid and the lower eyelid.

The above mentioned eyelid opening level determination device 50 according to the first embodiment may detect the lower eyelid based on the remaining lower eyelid line even if a part of the lower eyelid line is lost by overexposure.

In addition, if the image of the eyelid is taken with the inclined angle, the lower eyelid may be detected with accuracy since the edge group is detected after the rotation of the scanning window.

Second Embodiment

For the first embodiment, the eyelid opening level determination device 50 executes scanning using the scanning window, rotates the scanning window based on inclination angle of the edge group if total number of edges included in the edge group is exceeding the first threshold, calculates reliability value of the edge group within rotated scanning window, returns to the state before rotation of the scanning window and restarts scanning if the reliability value is not exceeding the second threshold, and determines the edge group within the scanning window having the reliability value if the reliability value is exceeding the second threshold.

On the other hand, for the second embodiment, the eyelid opening level determination device 50 may rotate a scanning window, scan using the rotated scanning window, extract edge groups within the rotated scanning window where the edge groups have a reliability value exceeding the second threshold, and determine edge group within the scanning window having maximum reliability value in the extracted edge groups as a lower eyelid.

The system of the eyelid opening level determination device 50 according to the second embodiment is similar to the first embodiment. Processes executed by the eyelid opening level determination device 50 according to the second embodiment is similar to the first embodiment except the lower eyelid detection process.

Figure 16:
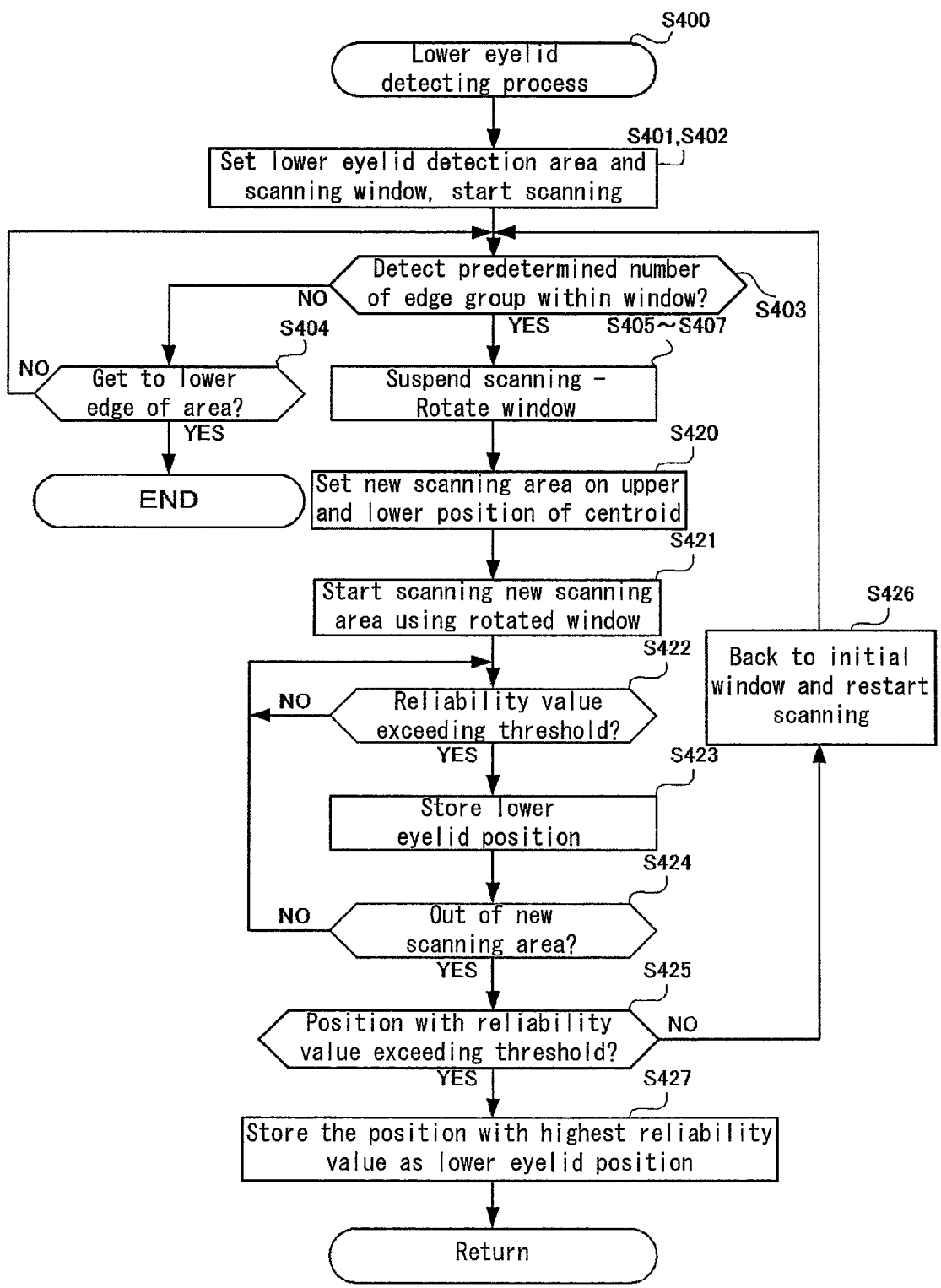
FIG. 16 is a flow chart explaining the lower eyelid detecting process of the eyelid condition determination process according to a second embodiment.

Hereinafter, with reference to FIG. 16, the lower eyelid detection process (step S400) according to the second embodiment will be explained in detail.

First, the CPU 24 executes processes similar to steps S401-S407 according to the first embodiment. Namely, the CPU 24 scans using the scanning window, rotates the scanning window around the centroid of the edge group based on calculated inclination angle if it is detected that total number of edges included in the edge group is exceeding the first threshold.

Next, in step S420, the CPU 24 sets a new scanning area centering around the centroid of the edge group.

Next, in step S421, the CPU 24 starts scanning from upper side to lower side of the new scanning area using the rotated scanning window (detection of edges where brightness value changes from bright to dark). In addition, the CPU 24 calculates reliability value of the edge group detected in the scanning window with scanning.

Next, in step S422, the CPU 24 determines whether the edge group having reliability value exceeding the second threshold is detected within the scanning window.

If edge group having reliability value exceeding the second threshold is not detected (step S422; NO), the CPU 24 returns to step S422.

If edge group having reliability value exceeding the second threshold is detected (step S42; YES), in step S423, the CPU 24 stores position of the edge group as a lower eyelid candidate to the RAM 25.

Next, in step S424, the CPU 24 determines whether the rotated scanning window reaches to lower side of the new scanning area.

If the rotated scanning window does not reach to lower side of the new scanning area (step S424; NO), the CPU returns to step S422.

If the rotated scanning window reaches to lower side of the new scanning area (step S424; YES), in step S425, the CPU 24 determines whether there is edge group having reliability value exceeding the second threshold by reference to the RAM 25.

If there is no edge group having reliability value exceeding the second threshold (step S425; NO), in step S426, the CPU 24 recovers the rotated scanning window and restarts scanning, then returns to the step S403.

If there is edge group having reliability value exceeding the second threshold (step S425; YES), in step S427, the CPU 24 determines edge group within the scanning window having the maximum reliability value in edge groups having reliability value exceeding the second threshold as a lower eyelid.

The above mentioned lower eyelid detection process according to the second embodiment may detect the lower eyelid with accuracy since the lower eyelid is determined from the stored edge groups exceeding the predetermined value and the edge group determined to the lower eyelid has the maximum reliability value.

Third Embodiment

For the third embodiment, the eyelid opening level determination device 50 may rotate a scanning window, scan using the rotated scanning window, determine the lower eyelid which is an edge group within the rotated scanning window where the edge groups have a reliability value exceeding the second threshold.

The system of the eyelid opening level determination device 50 according to the third embodiment is similar to the first embodiment. Processes executed by the eyelid opening level determination device 50 according to the third embodiment is similar to the first embodiment except the lower eyelid detection process.

Figure 17:
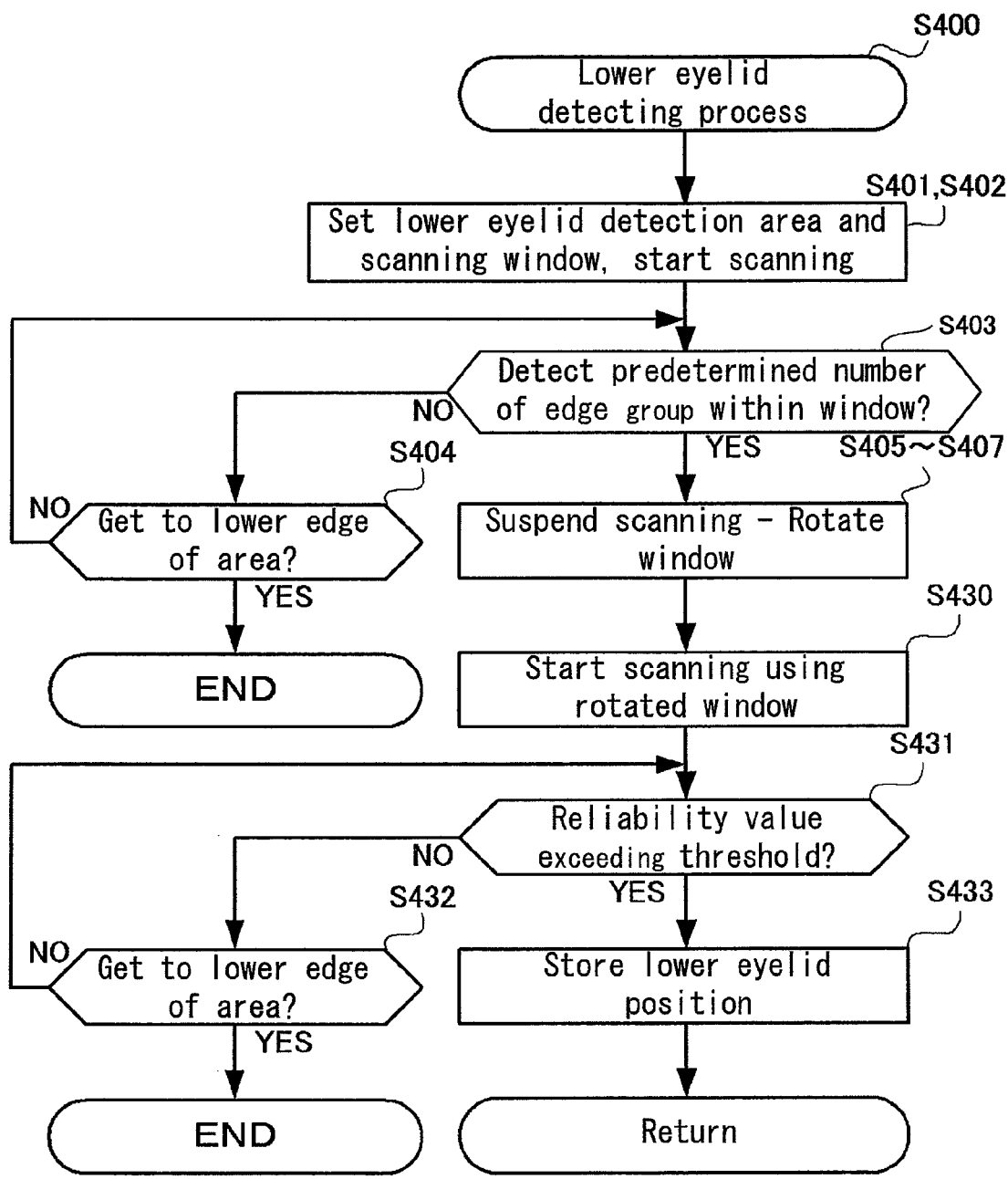
FIG. 17 is a flow chart explaining the lower eyelid detecting process of the eyelid condition determination process according to a third embodiment.

Hereinafter, with reference to FIG. 17, the lower eyelid detection process (step S400) according to the third embodiment will be explained in detail.

First, the CPU 24 executes processes similar to steps S401-S407 according to the first embodiment. Namely, the CPU 24 scans using the scanning window, rotates the scanning window around the centroid of the edge group based on calculated inclination angle if it is detected that total number of edges included in the edge group is exceeding the first threshold.

Next, in step S430, the CPU 24 starts scanning from upper side to lower side of the scanning area using the rotated scanning window (detection of edges where brightness value changes from bright to dark). In addition, the CPU 24 calculates reliability value of the edge group detected in the scanning window with scanning.

Next, in step S431, the CPU 24 determines whether the edge group having reliability value exceeding the second threshold is detected within the scanning window.

If the edge group having reliability value exceeding the second threshold is not detected (step S431; NO), in step S432, the CPU 24 determines whether the scanning window reaches to lower side of the lower eyelid searching area.

If the scanning window does not reach to lower side of the lower eyelid searching area (step S431; NO), the CPU 24 returns to step S431.

If the scanning window reaches to lower side of the lower eyelid searching area (step S431; YES), the CPU 24 terminates the eyelid condition determination process.

If the edge group having reliability value exceeding the second threshold is detected (step S431; YES), in step S433, the CPU 24 determines the detected edge group as the lower eyelid and stores to RAM 25, then, proceeds to the eyelid opening level determination process.

The above mentioned lower eyelid detection process according to the third embodiment may detect the lower eyelid with accuracy and with simple process in which searching of all area is not needed, since the lower eyelid is determined when the edge group exceeding the predetermined value after scanning of the scanning window rotated according to inclination angle of the detected edge group.

Fourth Embodiment

For the fourth embodiment, the eyelid opening level determination device 50 may detect an edge group where brightness value changes from bright to dark within a lower eyelid searching area, detect plural lines as lower eyelid candidates using a robust estimation method such as RANSAC (RANdom Sample Consensus) from the edge group, calculate reliability values of the detected lines, and determine the lower eyelid which is a line having the maximum reliability value. In addition, the reliability value may be calculated as the number of edges divided by the distance between a centroid of the upper eyelid and the line, The system of the eyelid opening level determination device 50 according to the fourth embodiment is similar to the first embodiment. Processes executed by the eyelid opening level determination device 50 according to the forth embodiment is similar to the first embodiment except the lower eyelid detection process.

Figure 18:
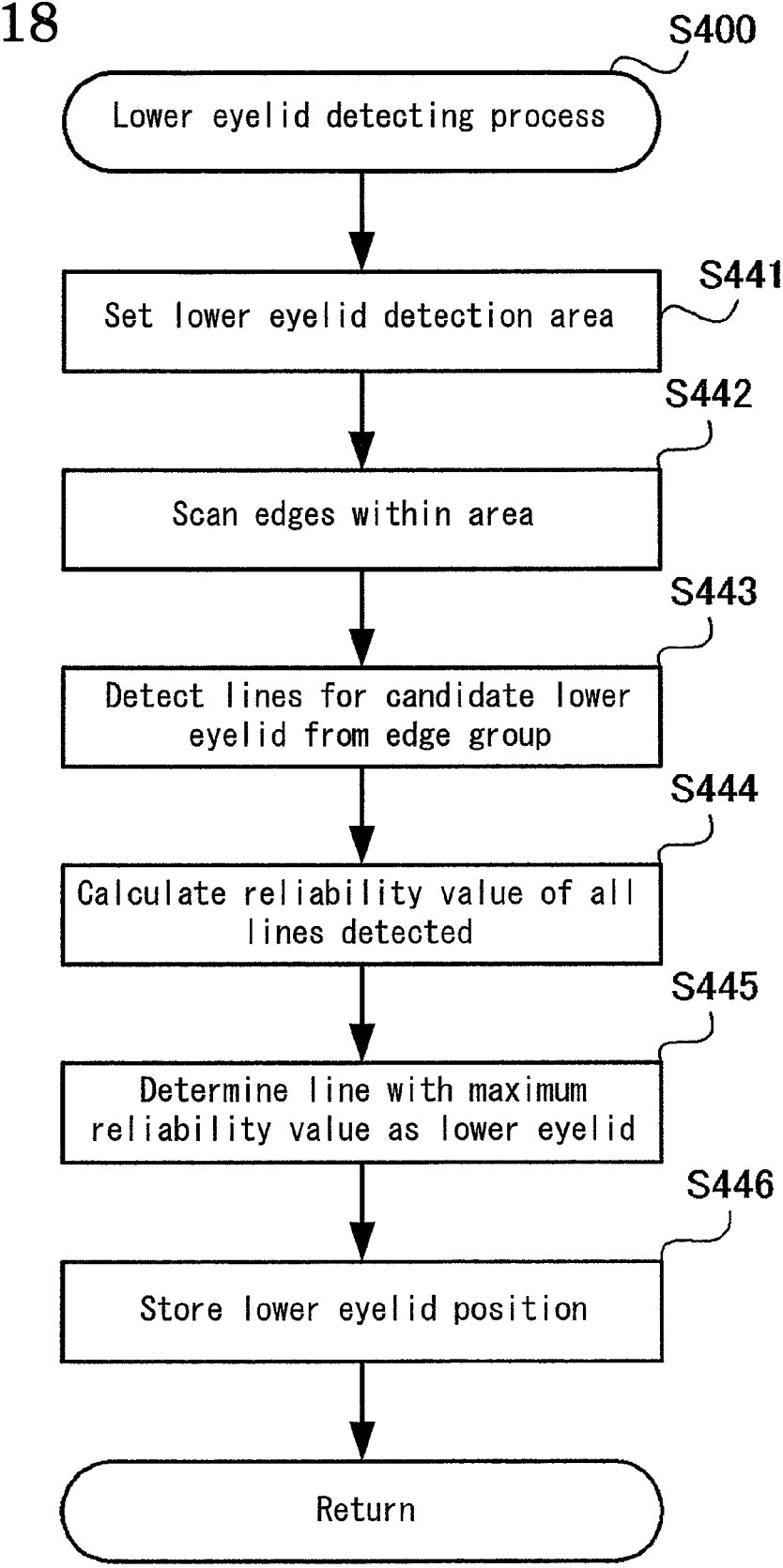
FIG. 18 is a flow chart explaining the lower eyelid detecting process of the eyelid condition determination process according to a forth embodiment.

Hereinafter, with reference to FIG. 18, the lower eyelid detection process (step S400) according to the fourth embodiment will be explained in detail.

First, in step S441, the CPU 24 sets the lower eyelid detection area, which has high possibility to include the lower eyelid, based on the position of the edge line for either the right eyelid or the left upper eyelid detected in the upper eyelid detecting process.

Next, in step S442, the CPU 24 starts scanning from the upper side to the lower side of the lower eyelid detection area, and starts detection of the edge where the brightness value changes from bright to dark.

Next, in step S443, the CPU 24 detects lines which will be lower eyelid candidates from the detected edge group using a robust estimation method such as RANSAC.

Next, in step S444, the CPU 24 calculates reliability values for all of the detected lines. In this step, the reliability value is calculated as the number of edges divided by the distance between a centroid of the upper eyelid and the selected line.

Next, in step S445, the CPU determines determine the lower eyelid which is a line having the maximum calculated reliability value, and in step 446, stores into the RAM 25, then, proceeds to the eyelid opening level determination process.

The above mentioned lower eyelid detection process according to the fourth embodiment may not be affected by noise since the edge group within the lower eyelid searching area is detected, plural lines which will be lower eyelid is detected using the robust estimation method such as RAMSAC from the detected edge group. In addition, the lower eyelid may be easily detected in a short time.

The invention may not be limited to the above embodiments, various types of variation and application may be available.

For addition, in the fourth embodiment, the eyelid opening level determination device 50 calculates the reliability value of lines detected, and determines the line having the maximum reliability value as the lower eyelid. However, the eyelid opening level determination device 50 calculates the reliability value of lines detected, and the lower eyelid is determined to the line which is the nearest from the upper eyelid, the line with the reliability value exceeding a predetermined value.

For the above mentioned embodiments, when the upper eyelid candidate or the lower eyelid candidate are extracted, the eyelid opening level determination device 50 extracts by means of edge detection using sobel filters. However, the eyelid opening level determination device 50 extracts by means of the density detection using density gradient in the image.

For the above mentioned embodiments, the computer 14 executes the eyelid opening level determination process for dynamic image of the face of the object person taken by the camera 10. However, for an application example, the dynamic image of the face of the object person taken by an external device other than the camera 10 may be stored into the image memory 22, and the eyelid opening level determination process may be executed for the dynamic image. In addition, the eyelid opening level determination process may be executed for plurality of images of the face.

For the above mentioned embodiments, the upper eyelid and the lower eyelid are detected for either right side or left side. However, the upper eyelid and the lower eyelid are detected for both right side and left side.

For the above mentioned embodiments, in the face area detecting process (step S200), the sobel filtering process is executed for the face image, and the face area is detected from the histogram based on the brightness value of the pixels comprised in the face image. However, for an application example, as disclosed in the Japanese Patent Application Laid-Open No. 2004-310396 (JP2004-310396A), each pixels comprised in the taken image may be differentiated with time, then a histogram may be generated in which the image differentiated with time may be projected to longitudinal direction, the histogram of the edge extraction image and the histogram of the time differentiation image may be added together, position having the highest several peak values within the added histogram may be determined to both ends of the face, and then the face area may be detected.

In the face area detecting process (step S200), the face area may be detected by template matching method in which the face image is matched to a template registered in advance.

The eyelid opening level determination device according to the invention may not be specialized system, instead, a general used computing system may be employed. For example, a program for executing the above mentioned operations stored in a readable storage media, such as a flexible disc, a CD-ROM, a DVD-ROM and the like is installed in 4 computer, which can be input the face image, and such computer may be used for executing the above mentioned processes in the same manner as the eyelid opening level determination device. Further, the program is uploaded to a memory device of a server, which is connected to a communication network such as the internet or the like, then the computer that is able to access the communication network downloads and installs the program, and such computer may be used for executing the above mentioned processes in the same manner as the eyelid opening level determination device.

The computer is run by an operating system (OS) and an application program. In a case where the processes are executed by the computer in the same manner as the above described function by the OS and the application program respectively, or by in cooperation with the OS and the application program, only the application program may be stored in the storage media or the memory device.

Additionally, the computing system may be delivered through the communication network by overlapping the program on a carrier wave. For example, the program may be uploaded to a server in the communication network so that the program is downloaded through the network to each computer. Then, the above mentioned processes may be executed by executing the program, which is installed in the computer, together with other application program under the control of the OS.

Additionally, other detailed constructions may be suitably changeable.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. An eyelid opening level determination device, comprising:
    a face image taking unit for taking a face image;
    a processor, including
    an upper eyelid detection unit for detecting an upper eyelid in the face image which is taken by the face image taking unit;
    a lower eyelid area setting unit for setting an area for searching a lower eyelid based on the upper eyelid detected by the upper eyelid detection unit;
    an edge group detecting unit for detecting an edge group where brightness changes from dark to bright as a lower eyelid candidate by scanning the area set by the lower eyelid area setting unit from an upper side to a lower side;
    a reliability value obtaining unit for obtaining a reliability value of the edge group detected by the edge group detecting unit;
    a lower eyelid determination unit in which the edge group having the reliability value exceeding a predetermined value in the edge group detected by the edge group detecting unit is determined to be the lower eyelid; and
    an eyelid opening level obtaining unit for obtaining an eyelid opening level based on positions for the upper eyelid and the lower eyelid; and
    a memory that stores a program for controlling the processor.

2. The eyelid opening level determination device according to claim 1, wherein:
    the edge group detecting unit scans the area set by the lower eyelid area setting unit from upper side to lower side with a scanning window, and detects the edge group as the lower eyelid candidate, where the edge group is detected as brightness change from dark to bright with scanning within the scanning window;
    the reliability value obtaining unit comprises:
    an inclination angle calculation unit for calculating an inclination angle of the edge group detected by the edge group detecting unit; and
    a window rotating unit for rotating the scanning window that includes the edge group detected by the edge group detecting unit based on the inclination angle calculated by the inclination angle calculation unit;
    the edge group detecting unit detects the edge group where brightness value changes from dark to bright within the scanning window rotated by the window rotating unit on the basis of the inclination angle calculated by the inclination angle calculation unit; and
    the reliability value obtaining unit obtains the reliability value of the detected edge group.

3. The eyelid opening level determination device according to claim 2, wherein the lower eyelid determination unit determines the edge group as the lower eyelid in the scanning window in a case where the reliability value of the edge group detected within the scanning window rotated by the window rotating unit exceeds the predetermined value.

4. The eyelid opening level determination device according to claim 2, wherein the edge group detecting unit sets a new area including the rotated scanning window, and detects the edge group by scanning within the new area using the scanning window rotated by the window rotating unit;
    the reliability value obtaining unit obtains the reliability value of the edge group detected within the scanning window scanned in the new area; and
    the lower eyelid determination unit determines the edge group to be the lower eyelid having the maximum reliability value within the scanning window in the obtained reliability values exceeding a predetermined value.

5. The eyelid opening level determination device according to claim 2, wherein the edge group detecting unit sets a new area including the rotated scanning window, and detects the edge group by scanning the new area using the scanning window rotated by the window rotating unit;
    the reliability value obtaining unit obtains the reliability value of the edge group detected within the scanning window scanning the new area; and
    the lower eyelid determination unit determines the edge group to be the lower eyelid within the scanning window in a case where the reliability value obtaining unit obtains the reliability value of the edge group exceeding a predetermined value.

6. The eyelid opening level determination device according to claim 2, wherein the reliability value obtaining unit calculates the reliability value by dividing a total number of edges included in the scanning window by a distance between a position of a centroid of the upper eyelid and the edge group within the scanning window.

7. The eyelid opening level determination device according to claim 2, wherein the window rotating unit rotates the scanning window about a centroid of the upper eyelid of the edge group within the scanning window.

8. The eyelid opening level determination device according to claim 1, wherein the reliability value obtaining unit estimates a line as a lower eyelid from the edge group detected by the edge group detecting unit, and calculates the reliability value of the estimated line; and
    the lower eyelid determination unit determines the line having the maximum reliability value to be the lower eyelid.

9. The eyelid opening level determination device according to claim 8, wherein the reliability value obtaining unit obtains the reliability value by dividing a total number of edges used for detecting the line by a distance between a position of a centroid of the upper eyelid and the line.

10. The eyelid opening level determination device according to claim 1, wherein the eyelid opening level obtaining unit obtains a distance between a centroid or a center of the upper eyelid detected by the upper eyelid detection unit and a centroid or a center of the lower eyelid determined by the lower eyelid determination unit to be the eyelid opening level.

11. The eyelid opening level determination device according to claim 1, wherein the eyelid opening level obtaining unit calculates a line approximating the upper eyelid detected by the upper eyelid detection unit, and obtains a maximum value of a distance of a perpendicular line from a point of the lower eyelid detected by the lower eyelid determination unit to the line to be the eyelid opening level.

12. The eyelid opening level determination device according to claim 1, wherein the eyelid opening level obtaining unit calculates a line approximating the lower eyelid detected by the upper eyelid detection unit, and obtains a maximum value of a distance of a perpendicular line from a point of the upper eyelid detected by the upper eyelid detection unit to the line to be the eyelid opening level.

13. The eyelid opening level determination device according to claim 1, wherein the upper eyelid detection unit detects an edge line where brightness changes from dark to bright with scanning within a predetermined area in the face image from upper side to lower side, and detects the upper eyelid by determining plural edge lines to be upper part of eyebrows, upper eyelids, nostrils, and mouth based on positional relationship of the determined plural edge lines.

14. A non-transitory computer readable medium storing a computer program, comprising:

an upper eyelid detection unit for detecting an upper eyelid in a face image which is taken by a face image taking unit;

a lower eyelid area setting unit for setting an area for searching a lower eyelid based on the upper eyelid detected by the upper eyelid detection unit;

an edge group detecting unit for detecting an edge group where brightness changes from dark to bright as a lower eyelid candidate by scanning the area set by the lower eyelid area setting unit from an upper side to a lower side;

a reliability value obtaining unit for obtaining a reliability value of the edge group detected by the edge group detecting unit;

a lower eyelid determination unit in which the edge group having the reliability value exceeding a predetermined value in the edge group detected by the edge group detecting unit is determined to be the lower eyelid; and an eyelid opening level obtaining unit for obtaining an eyelid opening level based on positions for the upper eyelid and the lower eyelid.

\* \* \* \* \*